US010589680B2

(12) United States Patent
Ward et al.

(10) Patent No.: US 10,589,680 B2
(45) Date of Patent: Mar. 17, 2020

(54) METHOD FOR PROVIDING AT LEAST ONE INFORMATION FROM AN ENVIRONMENTAL REGION OF A MOTOR VEHICLE, DISPLAY SYSTEM FOR A MOTOR VEHICLE DRIVER ASSISTANCE SYSTEM FOR A MOTOR VEHICLE AS WELL AS MOTOR VEHICLE

(71) Applicant: Connaught Electronics Ltd., Tuam, County Galway (IE)

(72) Inventors: Enda Peter Ward, Tuam (IE); Alan Hanniffy, Tuam (IE); Mike Togher, Tuam (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 141 days.

(21) Appl. No.: 15/858,519

(22) Filed: Dec. 29, 2017

(65) Prior Publication Data
US 2018/0186290 A1 Jul. 5, 2018

(30) Foreign Application Priority Data

Jan. 2, 2017 (DE) .......................... 10 2017 100 004

(51) Int. Cl.
*B60R 1/00* (2006.01)
*H04N 7/18* (2006.01)

(52) U.S. Cl.
CPC ............... *B60R 1/002* (2013.01); *B60R 1/00* (2013.01); *H04N 7/181* (2013.01);
(Continued)

(58) Field of Classification Search
None
See application file for complete search history.

(56) References Cited

U.S. PATENT DOCUMENTS

2009/0143967 A1* 6/2009 Lee .......................... B60R 1/00
701/119
2017/0280091 A1* 9/2017 Greenwood ............. B60R 1/00

FOREIGN PATENT DOCUMENTS

WO 2016026870 A1 2/2016

OTHER PUBLICATIONS

"#45 Producing a Picture-in-Picture Effect", Adobe Digital Video How-Tos: 100 Essential Techniques with Adobe Production Studio, https://flylib.com/books/en/4.192.1.51/1/ (Year: 1006).*

* cited by examiner

*Primary Examiner* — Lindsay J Uhl
(74) *Attorney, Agent, or Firm* — Osha Liang LLP

(57) ABSTRACT

The invention relates to a method for providing at least one information from an environmental region (8) of a motor vehicle (2) to a driver of the motor vehicle (2), wherein at least one first image (B3) captured by a vehicle-side camera system (6) and at least one second image (B4) captured by a vehicle-external camera system (7) situated within the field of view (19a, 19b) of the vehicle-side camera system (6) are received in the method, wherein an image-in-image representation (B5) is generated from the at least one first image (B3) and the at least one second image (B4) for displaying on a vehicle-side display device (13) as the at least one information, wherein a first image region (21) for displaying the at least one first image (B3) and a second image region (22) separate from the first image region (21) for displaying the at least one second image (B4) are determined for the image-in-image representation (B5). In addition, the invention relates to a display system (11), to a driver assistance system (5) as well as to a motor vehicle (2).

14 Claims, 6 Drawing Sheets

Figure 1:
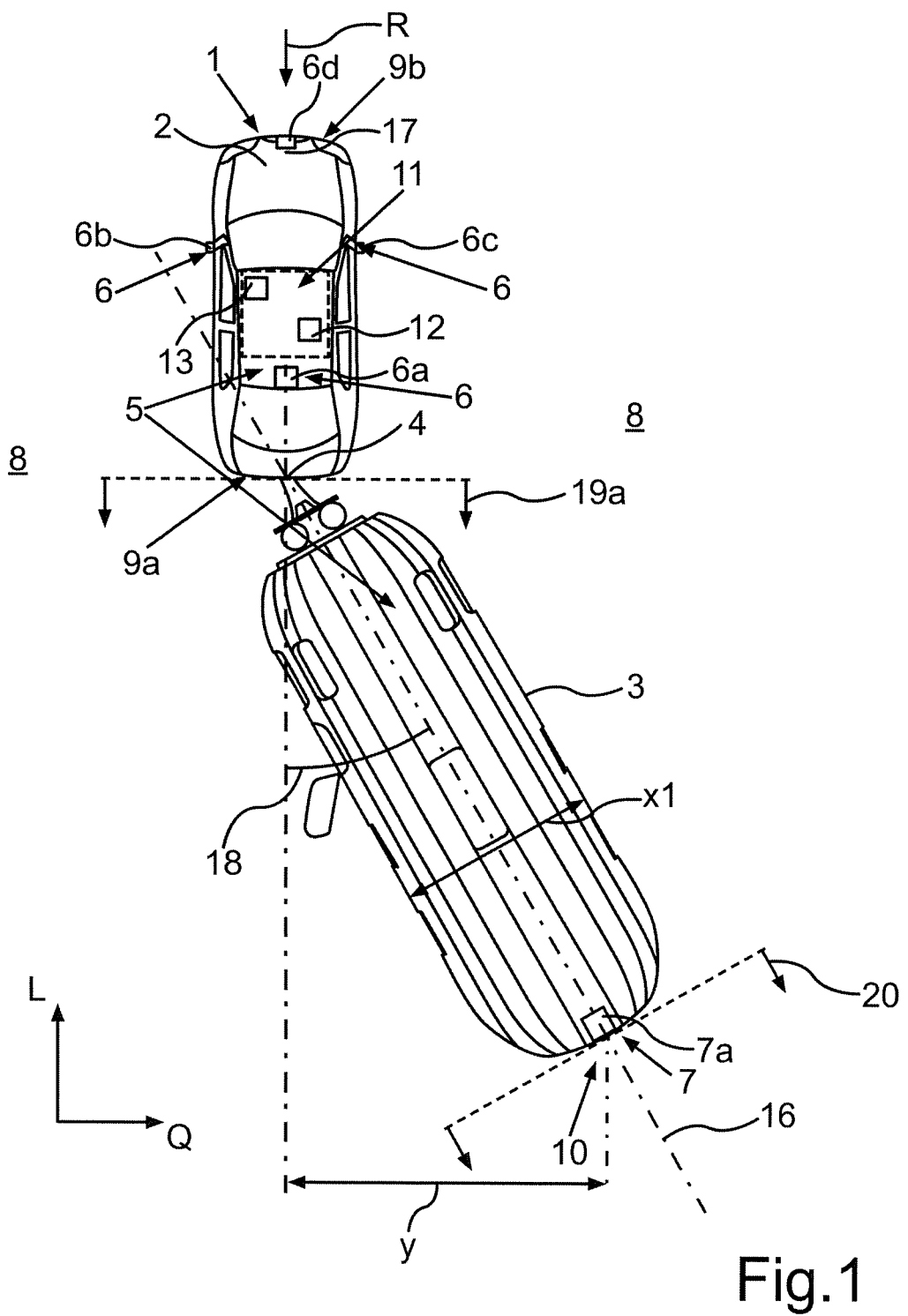

(52) U.S. Cl.
CPC ... *B60R 2300/105* (2013.01); *B60R 2300/303* (2013.01); *B60R 2300/50* (2013.01); *B60R 2300/60* (2013.01); *B60R 2300/802* (2013.01); *G06T 2207/30252* (2013.01)

METHOD FOR PROVIDING AT LEAST ONE INFORMATION FROM AN ENVIRONMENTAL REGION OF A MOTOR VEHICLE, DISPLAY SYSTEM FOR A MOTOR VEHICLE DRIVER ASSISTANCE SYSTEM FOR A MOTOR VEHICLE AS WELL AS MOTOR VEHICLE

The invention relates to a method for providing at least one information from an environmental region of a motor vehicle to a driver of the motor vehicle, wherein at least one first image captured by a vehicle-side camera system and at least one second image captured by a vehicle external camera system present within a field of view of the vehicle-side camera system are received in the method. In addition, the invention relates to a display system for a motor vehicle, to a driver assistance system for a motor vehicle as well as to a motor vehicle.

It is already known from the prior art to assist a driver of a motor vehicle in that, for example, information from the environmental region of the motor vehicle in the form of images of the environmental region are captured by a vehicle-side camera system and, for instance in the form of a video sequence, are displayed on a vehicle-side display device. Problems arise in this connection when objects or devices are present in the field of view of the vehicle-side camera system and these cover areas of the environmental area that are relevant to the driver. This can for instance occur, if a trailer, for instance a caravan or a horse trailer, is coupled to the motor vehicle. Since an environmental region behind the trailer is usually not visible for the driver upon looking into the interior mirror, information from the environmental region of the vehicle/trailer combination comprising the motor vehicle and the trailer in the form of images of the environmental region behind the trailer can be captured by a trailer-side camera system and be displayed on the vehicle-side display device for example in the form of a video sequence for assisting the driver.

It is also known to generate a composite image from image data of the trailer-side camera system and a vehicle-side camera system, for example by "stitching", which represents the environmental region behind the motor vehicle and the trailer, but without the trailer itself. This is also referred to as "transparent trailer" representation. Thus, the driver can perceive the environmental region behind the trailer. Therein, the "transparent trailer" can be displayed on the display device as a partially transparent overlay by for example only displaying outlines of the trailer in the image on the display device. Thus, the driver gets the impression as if he could look through the trailer. For example, this is disclosed in WO 2016/026870 A1.

However, therein, it can occur that the image generation or image synthesis is incorrect and thereby the images displayed on the display device are not intuitive for the driver since the images for example do not show the actual environmental region behind the motor vehicle due to the incorrect image synthesis. This is in particular the case in turning-around maneuvers of the vehicle/trailer combination, in turning of the vehicle/trailer combination or in reversing of the vehicle/trailer combination with pivoted trailer. In the representation of the "transparent trailer", it is also difficult for the driver to estimate distances between objects behind the trailer and the trailer itself since depth effect or depth impression intuitive for the driver often lacks in the representations.

It is the object of the present invention to provide a solution how information from an environmental region of a motor vehicle can be particularly intuitively and reliably provided to a driver of the motor vehicle.

According to the invention, this object is solved by a method, a display system, a driver assistance system as well as a motor vehicle having the features according to the respective independent claims. Advantageous embodiments of the invention are the subject matter of the dependent claims, of the description as well as of the figures.

In a method according to the invention for providing at least one information from an environmental region of a motor vehicle to a driver of the motor vehicle, at least one first image captured by a vehicle-side camera system and at least one second image captured by a vehicle-external camera system present within a field of view of the vehicle-side camera system are received. Moreover, an image-in-image representation is generated from the at least one first image and the at least one second image as the at least one information for displaying on a vehicle-side display device, wherein a first image region for displaying the at least one first image and a second image region separate from the first image region for displaying the at least one second image are determined for the image-in-image representation.

By means of the method, a driver assistance system can be realized, which assists a driver of the motor vehicle in maneuvering or driving with the motor vehicle. Thereto, a representation of the environmental region of the motor vehicle is generated as the at least one information, for example by a control device of the driver assistance system, for assisting the driver, which can be displayed on the vehicle-side display device in a manner particularly intuitive for the driver. Therein, the environmental region is in particular displayed in the form of a video sequence in real time on the display device. The display device can for example be a screen in an interior of the motor vehicle, e.g. in a dashboard and/or in a rearview mirror of the motor vehicle and/or in a center console of the motor vehicle, and/or a head-up-display device or a head-up display. The control device can for example be integrated in a vehicle-side controller.

For generating the image-in-image representation, first, vehicle-side images captured by at least one camera of the vehicle-side camera system from an environmental region of the motor vehicle, are received by the control device of the driver assistance system. The at least one vehicle-side camera can for example be a rear camera of the motor vehicle, which is disposed in a rear area of the motor vehicle and is able to capture the environmental region behind the motor vehicle in images, and/or a front camera, which is arranged on a front portion of the motor vehicle and can capture the environmental region in front of the motor vehicle in images. However, it can also be that the vehicle-side camera system includes two wing mirror cameras, which are disposed at or instead of wing mirrors at the motor vehicle and are able to capture the environmental region next to and behind the motor vehicle in images. In addition, second images are captured by at least one camera of the vehicle-external camera system. An object or a device, on which the vehicle-external camera system is located, is arranged in such a way in the field of view of the vehicle-side camera system that a partial area of the environmental region is covered by the device. Thereby this partial area is hard to be viewed or cannot be viewed by the driver. The covered partial area, however, can be captured by the vehicle-external camera system in images. A field of view of the vehicle-external camera system consequently overlaps at least in portions with the field of view of the vehicle-side camera system. In particular the vehicle-external camera system and the vehicle-side camera system have at least partly the same viewing direction.

These images of the vehicle-side camera system and of the vehicle-external camera system are simultaneously displayed on the display device in an overall image in the form of the image-in-image representation. Thus, the overall image comprises the first image region, in which the first images of the environmental region are displayed, and the second image region smaller compared to the first image region, in which the second images of the covered partial area are displayed. Therein, the images displayed in the two image regions were in particular captured at the same time by the respective camera system such that the driver is able to simultaneously perceive or view the environmental region behind the device carrying the vehicle-external camera system and the motor vehicle. From displaying the images of both camera systems, the advantage arises that the driver can anytime completely capture the environmental region around the motor vehicle.

Therein, the second image region is in particular rectangularly formed and is in particular surrounded by the first image region on at least three lateral edges. Thus, the second image region is displayed within the first image region at least in certain areas. Thus, the first image region is in particular U-shaped formed. It can also be provided that the second image region is completely surrounded by the first image region. The second image region is in particular displayed in an image position in the overall image, in which the device carrying the vehicle-external camera system would be in the vehicle-side first images. Thus, the second image region with the image captured by the vehicle-external camera system is displayed instead of the image section with the device in the first image region.

Thus, the first and the second images are not combined to a single image, for example by "stitching" or composing, which conveys the impression as if it was captured by only one camera. Rather, the images are displayed in image regions optically separated from each other such that the driver is able to uniquely recognize based on the separated image regions, from which camera the respective image was captured. Herein, the invention is based on the realization that it can occur that the images are incorrectly combined in "stitching", for example due to the different perspectives of the cameras of the camera systems. If the vehicle-side camera and the vehicle-external camera for example have a height offset in vehicle vertical direction and the installation positions of the cameras at the motor vehicle and at the device are not exactly known, thus, it can occur that the images cannot be seamlessly combined to the overall image and thus the overall image is not intuitive for the driver. This can be prevented by the image-in-image representation and the environmental region can be represented in a manner particularly intuitive for the driver.

Particularly preferably the at least one second image is captured by a trailer-side camera of the vehicle-external camera system of a trailer connected to the motor vehicle and the at least one first image is captured by at least one camera of the vehicle-side camera system of the motor vehicle. According to this preferred embodiment the device carrying the vehicle-external camera system is consequently a trailer, which is coupled to the motor vehicle. The vehicle-external camera system is thus a trailer-side camera system.

The motor vehicle and the trailer form a vehicle/trailer combination, wherein the driver is provided with at least one information from the environmental region of the vehicle/trailer combination.

Here, the at least one first image is captured by at least one rearward looking camera of the vehicle-side camera system, for instance the rear camera or the wing mirror cameras. The trailer-side camera system in particular a camera attached to a rear portion of the trailer. The trailer-side camera can also be formed as a rearward looking camera and capture the environmental region behind the trailer. The environmental region behind the vehicle/trailer combination is usually poorly or not visible for the driver of the vehicle/trailer combination because a view by a rearview mirror of the motor vehicle is blocked by the trailer.

In order to assist the driver in maneuvering with the combination, the images of the vehicle-side environmental region and the trailer-side environmental region, which due to the trailer is not visible for the driver, is simultaneously displayed in an overall image in the form of the image-in-image representation on the display device. For this purpose the at least second image is wirelessly and/or wired transmitted by the trailer side camera system to the vehicle side control device. From the displaying of the images of the two camera systems the advantage arises that the driver upon driving forward and upon driving backward with the combination at any time can fully capture the environmental region around the vehicle/trailer combination. Namely, the rearview mirror or interior mirror of the motor vehicle blocked by the trailer can be replaced with the images of the trailer-side camera system.

In a further embodiment of the invention the at least second image is captured by at least one camera of the vehicle-external camera system of another vehicle, which is present in the field of view of the vehicle side camera system. The at least one first image is captured by at least one camera of the vehicle-side camera system. The field of view of the at least one vehicle-side camera is oriented along a field of view of the at least one camera of the vehicle-external camera system. According to this embodiment the device carrying the vehicle-external camera system is consequently the other vehicle, on which the vehicle-external camera system is arranged. The other vehicle can for instance equally comprise a rear view camera, a front camera, and two wing mirror cameras. The other vehicle can for instance be another motor vehicle following the motor vehicle and/or another motor vehicle driving in front of the motor vehicle. In the case of the vehicle following the motor vehicle starting from the motor vehicle the environmental region behind the following vehicle is covered. Then for the image-in-image representation the at least one first image of the environmental region behind the motor vehicle is captured in particular by the vehicle-side rear view camera or the wing mirror cameras. The at least one second image for the image-in-image representation is captured in particular by the rear view camera of the following vehicle. The first and the second images are thus captured by rearward looking cameras of the motor vehicle and the following vehicle. In the case of a vehicle driving in front of the motor vehicle starting from the motor vehicle the environmental region in front of the vehicle driving in front is covered. Then for the image-in-image representation the at least one first image of the environmental region in front of the motor vehicle is captured in particular by the vehicle-side front camera or the wing mirror cameras. The at least one second image for the image-in-image representation is in particular captured by the front camera of the vehicle driving in front. The first and the second images are thus captured by front looking cameras of the motor vehicle and the vehicle driving in front.

The at least one second image in this connection is transmitted in particular wirelessly from the vehicle-external camera system to the vehicle-side control device, for instance via WiFi, 4G, 5G, DSRC ("Dedicated Short Range Communication") or LiFi ("Light Fidelity").

From the displaying of the images of the two camera systems the advantage arises that the driver at any time can fully capture the environmental region. Thus the driver of the motor vehicle can for instance recognize whether an overtaking of a vehicle driving in front and a going back into the lane after overtaking is possible without risk, since the environmental region in front of the other vehicle in the second image region of the image-in-image representation is visualized to him.

Particularly preferably, a perspective representation generating a depth effect of a bevel frame surrounding the second image region at least in certain areas is determined for displaying on the display device, by which the second image region appears rearward offset with respect to the first image region in the image plane of the image-in-image representation. Herein, the invention is based on the realization that the trailer-side camera is usually disposed spaced from the vehicle-side camera along a vehicle longitudinal direction and offset with respect to the vehicle-side camera. The vehicle-side camera therefore captures images, which show the environmental region adjoining to the motor vehicle, whereas the vehicle-external, for instance the trailer-side camera captures images, which show the environmental region adjoining to the device, for instance the trailer. In order to visualize the different positions of the cameras along the vehicle longitudinal direction to the driver, the second image region is optically separated from the first image region by the perspective representation of the bevel frame or the bevel and therein the depth effect is generated at the same time. In viewing the image-in-image representation, thus, the impression arises for the driver as if the second image region would be offset with respect to the first image region in the image plane of the image-in-image representation. The image-in-image representation with depth effect is particularly intuitive for the driver, because it is visualized to him that the vehicle-external camera is offset with respect to the vehicle-side camera. In the case of the image of the trailer-side camera and/or the image of a vehicle following the motor vehicle the second image region appears to be rearward offset in relation to the first image region, whereby it is indicated to the driver that the trailer side camera and/or the camera of the vehicle following the motor vehicle is rearward offset in relation to the vehicle-side camera. Otherwise stated, it is displayed to the driver that the vehicle-side environmental region displayed in the first image region is located farther ahead in vehicle longitudinal direction than the environmental region displayed in the second image region. In the case of the image of a vehicle driving in front of the motor vehicle the second image region appears to be forward offset in relation to the first image region, whereby it is indicated to the driver that the camera of the vehicle driving in front of the motor vehicle is forward offset in relation to the vehicle-side camera. In other words, it is indicated to the driver that the vehicle-side environmental region displayed in the first image region is situated further backward in the vehicle longitudinal direction than the environmental region displayed in the second image region.

For generating a predetermined perspective difference between the second image region and the first image region, a shape of the frame is preferably determined depending on a position of the vehicle-external camera system with respect to a position of the vehicle-side camera system. The second images and the first images have a respective perspective depending on a position of the respective camera. Therein, this perspective difference is for example depending on a longitudinal distance between the vehicle-external camera and the vehicle-side camera. In the case of a camera arranged on a trailer the distance, thus depends on a length of the trailer. The longer the trailer, the greater the distance between the vehicle-side camera and the trailer-side camera system. Therefore, the second image region is to appear farther rearward or forward offset with respect to the first image region in the image-in-image representation with increasing distance of the camera systems. Thus, the depth of the image-in-image representation is in particular determined depending on a longitudinal distance of the two cameras and changed by the shape of the bevel frame represented in the overall image.

The perspective difference is also depending on a height offset between the two camera systems, thus a distance of the camera systems in vehicle vertical direction. If the vehicle-external camera is disposed above the vehicle-side camera in vehicle vertical direction, thus, by the shape of the frame in viewing the image-in-image representation, the impression can be conveyed as if one would view into the second image region from obliquely below. If the vehicle-external camera is disposed below the vehicle-side camera in vehicle vertical direction, thus, by the shape of the frame or the orientation of the bevel edges of the bevel areas representing the frame elements, the impression can be conveyed as if one would look into the second image region from obliquely above. Thereby, the position of the vehicle-external camera with respect to the vehicle-side camera can be particularly well visualized to the driver. In the case of the trailer-side camera system, the relative position of the vehicle-side camera system to that of the trailer-side camera system can for example be determined based on geometric data of the trailer, in particular a length and a height of the trailer. For example, the geometric data can be manually input by the driver of the vehicle/trailer combination and be recorded in a vehicle-side storage device. Alternatively or additionally, the geometric dimensions of the trailer can be automatically determined during a calibration process of the trailer, in which data or parameters of the trailer are determined for example based on sensor data and recorded in the vehicle-side storage device. In the case of a camera system of another vehicle, the relative position of the vehicle-side camera system relative to that of the vehicle-external camera system can be determined for instance on the basis of sensor data, which are captured by a sensor device of the motor vehicle. Such a sensor device can for instance be a distance sensor device and/or the vehicle-side camera system itself. Thus for instance the distance between the motor vehicle and another vehicle can be captured.

Therein, it can be provided that frame elements are determined for the perspective representation of the frame, which are displayed adjoining to the lateral edges of the second image region in displaying on the display device and which are formed from perspective representations of bevel areas, wherein a width of the bevel areas and an orientation of bevel edges of the bevel areas are changed for generating the predetermined perspective difference. For example, the frame can have four frame bars or frame elements forming a rectangle, which are represented adjoining to the lateral edges of the second image region. Therein, a vertical frame element and a horizontal frame element are respectively represented at corners of the second image region joining up in miter. The frame elements are determined as perspective representations of bevel areas. The depth effect is in particular generated by a length of the bevel edges of the bevel areas, which represent the miters of the joining frame elements. The viewing direction to the second image region is in particular changed via the width of the frame elements. Therein, the width of a frame element can tend to zero, whereby the frame element is represented as a single stripe. If all of the frame elements have the same width as well as all of the bevel edges have the same length and extend towards a vanishing point located centrally in the second image region, thus, the impression arises as if one would frontally look into the interior of a one-sided open cube, wherein an inner side of a rear wall of the cube forms the second image region and inner sides of a jacket wall form the frame.

In an advantageous embodiment, a minimum width of the second image region in horizontal direction in the image-in-image representation is determined depending on a width of a device carrying the vehicle-external camera system. In the case of the trailer-side camera system the minimum width thus is determined in dependency on the width of the trailer. Therein, the width of the trailer can be manually input by the driver of the vehicle/trailer combination and be recorded in a vehicle-side storage device. Alternatively or additionally, the width of the trailer can be automatically determined during the calibration process of the trailer. In the case of the camera system of the other vehicle the minimum width is determined in dependency on the width of another vehicle, which for instance can be determined on the basis of sensor data. The minimum width or standard width of the second image region is therefore adapted to the width of the device. Thereby, a width of an area within the frame and thereby a length of the horizontal frame elements are also adapted to the width of the device. Thereby, it can be ensured that the area behind or in front of the device relevant and not visible to the driver is completely displayed in the image-in-image representation within the second image region.

In a development of the invention, the second image region is determined located centrally within the image-in-image representation in horizontal image direction. This means that a standard image position of the second image region is preset such that respective distances of the vertical lateral edges of the second image region to the respective adjacent vertical image edges of the overall image are equally sized. In particular, it is provided that the second image region is disposed in an upper half of the overall image in vertical image direction. This means that a distance between the upper horizontal lateral edge of the second image region to the horizontal upper image edge of the overall image is larger than a distance between the lower horizontal lateral edge of the second image region and the horizontal lower image edge of the overall image.

It proves advantageous if a width of the second image region and/or a location of the second image region in the image-in-image representation and/or a shape of the second image region are adapted to a lateral offset between the vehicle-side camera system and the vehicle-external camera system. The lateral offset is an offset of the vehicle-external camera system to the vehicle-side camera system along a vehicle lateral direction of the motor vehicle. In the case of another vehicle this lateral offset for instance occurs, when a driving direction of the other vehicle is orientated obliquely relative to a vehicle direction of the motor vehicle. This can be captured for instance by means of a sensor device of the motor vehicle. In the case of a trailer the lateral offset between the camera systems can be determined via a pivot angle between the trailer and the motor vehicle. Herein, this is based on the realization that the trailer-side camera system is fixedly disposed at the trailer, while the trailer is pivotably supported on the motor vehicle. This means that the trailer-side camera system changes its relative location to the vehicle-side camera system upon pivoting of the trailer, for example in a turning-around maneuver or a turning maneuver. In the non-pivoted state of the trailer, thus upon straight travel of the vehicle/trailer combination, the vehicle longitudinal axis is oriented along a longitudinal axis of the trailer. In this case, the pivot angle or attachment angle is equal to zero and the lateral distance between the camera systems has a first value, in particular zero. In the case, in which the lateral offset between the vehicle-side and the vehicle-external camera system has a minimum value, in particular equal to zero, the second image region is in particular displayed with the minimum width, rectangularly shaped and located centrally within the first image region.

In the pivoted state of the trailer, the vehicle longitudinal axis is oriented obliquely to the longitudinal axis of the trailer. In this case, the attachment angle is unequal to zero and the lateral distance between the camera systems has a second value, in particular greater than zero in magnitude. In the case, in which the lateral offset between the vehicle-side and the vehicle-external camera system is larger than the minimum value, in particular unequal to zero, the second image region can be displayed with a width greater compared to minimum width, wherein the width increases in particular only in the image direction corresponding to a direction of displacement, for instance the pivot direction of the trailer. Alternatively or additionally, the second image region is shifted in horizontal image direction along the corresponding direction of displacement in the overall image, thus to the right or to the left. It can also be provided that the shape of the second image region changes for example from rectangular to trapezoidal if the offset is unequal to zero, for instance the trailer is pivoted with respect to the motor vehicle. Corresponding to the second image region, the frame is also changed depending on the lateral offset.

In the pivoted state of the trailer, the longitudinal distance between the camera systems usually also changes because the trailer-side camera system moves towards the vehicle-side camera system. Thus, a shape of the frame can also be adapted such that the depth effect is adapted to the current longitudinal distance between the camera systems.

According to an embodiment of the invention, in case of receiving at least one first partial image captured by a left wing mirror camera of the vehicle-side camera system and at least one second partial image captured by a right wing mirror camera of the vehicle-side camera system, the first image region is divided into a first partial image region for displaying the first partial image and a second partial image region for displaying the second partial image. In particular, a graphic separating element for separating the first and the second partial image region in the form of a vertical stripe is determined for displaying on the display device, wherein the first partial image region is displayed adjoining to the graphic separating element on the left side and the second partial image region is displayed adjoining to the graphic separating element on the right side.

According to this embodiment of the invention, the vehicle-side camera system includes the two wing mirror cameras, which capture the lateral environmental regions adjoining to the motor vehicle as well as the environmental region behind and in front of the motor vehicle in images. Thus, the left wing mirror camera captures the lateral, rear and frontal environmental region adjoining to the motor vehicle on the left side in images and the right wing mirror camera captures the lateral, rear and frontal environmental region adjoining to the motor vehicle on the right side in images. Thus, the first partial image region is displayed on the left side on the display device with the images of the left wing mirror camera and the second partial image region is displayed on the right side on the display device with the images of the right wing mirror camera. In addition, the separating element in the form of a vertical stripe can be displayed, which optically separates the two partial image regions from each other. By the representation of the images of the wing mirror cameras, the advantage arises that the driver can also see a blind spot of the motor vehicle.

It can also be provided that an object in an environmental region of the motor vehicle is captured based on received vehicle-side and/or vehicle-external sensor data and the presence of the object is visualized as at least one further information by changing a color of the frame in displaying on the display device at least in certain areas. Thus, the frame can be used in connection with further assistance systems for assisting the driver in driving with the motor vehicle. Such assistance systems can for example be a cross-traffic alert (CTA), a blind spot detection (BLS) or a rear end collision warning (RECW). The presence of the object, for example of another vehicle or a pedestrian, can for example be captured based on the images of the vehicle-side and/or vehicle-external camera system and/or based on distance sensor data. A location and/or location change of the object relative to the motor vehicle can then be determined based on the sensor data. Depending on the presence of the object, in particular also depending on the location and/or location change, the color of the frame is then changed. For example, the frame can be presented flashing if cross-traffic approaches. If the cross-traffic approaches from the left, the left-side vertical frame element can be presented flashing, if the cross-traffic approaches from the right, the right-side vertical frame element can be presented flashing. In case of the cross-traffic, the overall image can also be represented as a divided screen or "split screen". If an object approaches the motor vehicle from behind or is in a blind spot of the motor vehicle, the frame can be presented in a warning color, for example red and/or in flashing manner. The color change of the frame can therefore be used as an optical warning signal for the driver of the motor vehicle. Thus, a plurality of information from the environmental region of the motor vehicle can be provided to the driver by means of the method.

In a development of the invention, a status of a calibration of the trailer-side camera system, in which at least one parameter of the trailer, in particular at least one geometric dimension of the trailer, is captured, is determined and a color of the perspective representation of the bevel frame is determined depending on the status of the calibration. In particular if the trailer is coupled to the motor vehicle for the first time, the trailer is calibrated with respect to the motor vehicle. During the calibration, in particular geometric dimensions of the trailer are determined, for example to be able to assist the driver in a parking operation with the trailer. Thereto, for example so-called orientation lines describing a presumable path of movement of the trailer can for example be displayed as overlays on the display device. These orientation lines are usually displayed starting from wheels or lateral areas of the trailer. In order to be able to display these orientation lines in the correct image position, geometric dimensions of the trailer, in particular a width of the trailer, have to be known thereto. In a non-calibrated state or with a not yet terminated calibration, this information about the trailer lacks. In order to prevent the orientation lines from being displayed in the false image position, the display of the orientation lines is omitted in the non-calibrated state of the trailer with respect to the motor vehicle. In order to visualize the non-calibrated state to the driver, the frame can be represented in a first color, for example grey, on the display device. In the calibrated state, thus, as soon as the at least one parameter of the trailer is known, the frame can be displayed in a second color, for example green. Thus, the calibrated state of the trailer-side camera system can be displayed to the driver.

It proves advantageous if a distance between the motor vehicle and the trailer is captured in a pivoted state of the trailer, wherein a color of the frame is changed and/or a warning symbol is displayed on the display device as soon as the distance falls below a predetermined limit value. In particular during a turning-around maneuver of the vehicle/trailer combination, it can occur that the trailer moves towards the motor vehicle and the motor vehicle can be damaged if the trailer collides with the motor vehicle. The color of the bevel can be used to warn the driver of this collision. Thereto, the color is changed if the distance between the motor vehicle and the trailer falls below the limit value. In addition, a warning symbol, for example an icon of the vehicle/trailer combination or an image of a slide control, can additionally be displayed, whereby it is pointed out to driver when or that it is fallen below the limit value. Thus, the driver can react in time to avoid the collision between the trailer and the motor vehicle.

In case that the trailer-side camera is fixed to a tailgate of the trailer, the image-in-image representation can be terminated if the tailgate of the trailer is opened. The opening of the tailgate can for example be detected based on a motion sensor. The motion can also be detected by analyzing the trailer-side images in case of a stationary state of the motor vehicle or in the standstill of the motor vehicle. Thereto, an optical flow can be detected in the images, thus a motion of pixels in the images, if the tailgate of the trailer opens.

In addition, the invention relates to a display system for a motor vehicle comprising a control device and a display device, wherein the control device is adapted to receive at least one first image captured by a vehicle-side camera system and at least one second image captured by a vehicle-external camera system present within a field of view of the vehicle-side camera system. Moreover, the control device is adapted to generate an image-in-image representation from the at least one first image and the at least one second image for displaying on the vehicle-side display device by determining a first image region for displaying the at least one first image and a second image region separate from the first image region for displaying the at least one second image for the image-in-image representation. The display device is adapted to display the image-in-image representation. Thus, the control device is adapted to perform a method according to the invention or an advantageous embodiment thereof. The display device is in particular formed for disposing in the interior or the passenger cabin of the motor vehicle.

Further, a driver assistance system for a motor vehicle for assisting a driver of the motor vehicle, including a vehicle-side camera system for disposing at the motor vehicle and for capturing at least one first image and including a display system according to the invention is associated with the invention. The vehicle-side camera system in particular includes a rear camera for disposing in a rear area of the motor vehicle and/or a front camera for arrangement on a rear portion of the motor vehicle and/or two wing mirror cameras for disposing at or instead of wing mirrors of the motor vehicle.

In the case of a trailer coupled to the motor vehicle the driver assistance system moreover comprises a trailer-side camera system for capturing the at least one second image. The trailer-side camera system in particular includes a rear camera for disposing in a rear area of the trailer. Therein, the cameras in particular look in rear direction in the installed state at the motor vehicle and at the trailer, respectively, such that they can capture the area behind the motor vehicle and the trailer, respectively, in images.

A motor vehicle according to the invention comprises a driver assistance system according to the invention. The motor vehicle is in particular formed as a passenger car.

By means of the motor vehicle according to the invention and a trailer, on which the vehicle-external camera system is arranged a vehicle/trailer combination according to the invention can be realised. In this case, the motor vehicle comprises a tow coupling for attaching a trailer. The trailer is for example a caravan or a horse trailer.

The preferred embodiments presented with respect to the method according to the invention and the advantages thereof correspondingly apply to the display system according to the invention, to the driver assistance system according to the invention as well as to the motor vehicle according to the invention.

With indications of "behind", vehicle longitudinal direction", "lateral", "within", "right", "left" etc., the positions and orientations given with an observer looking along a vehicle longitudinal axis of the motor vehicle are specified.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

Now, the invention is explained in more detail based on preferred embodiments as well as with reference to the attached drawings.

Figure 2:
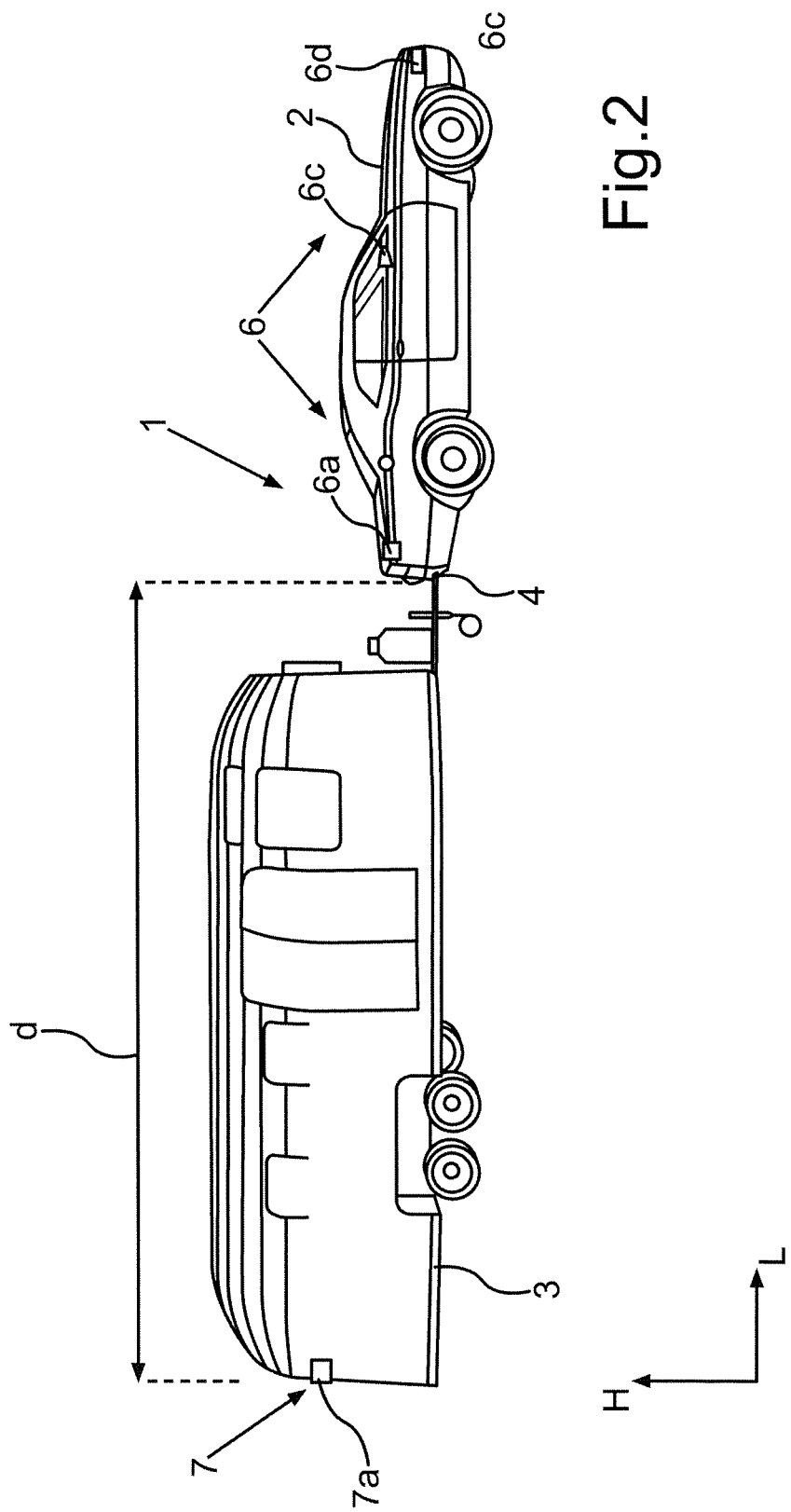
Figure 3:
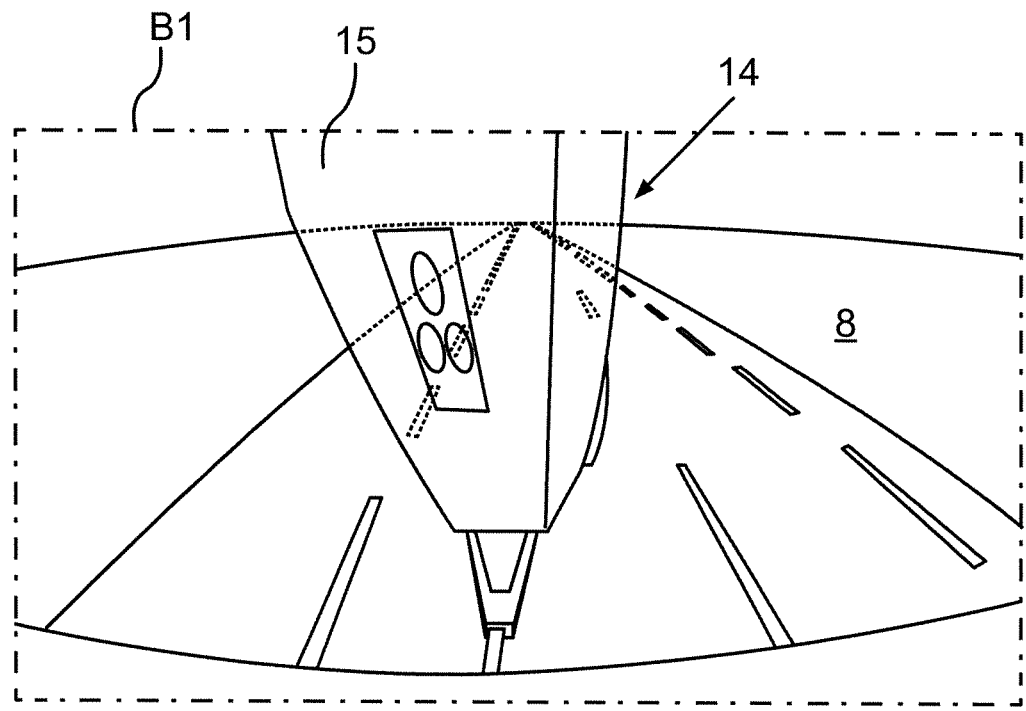
Figure 4:
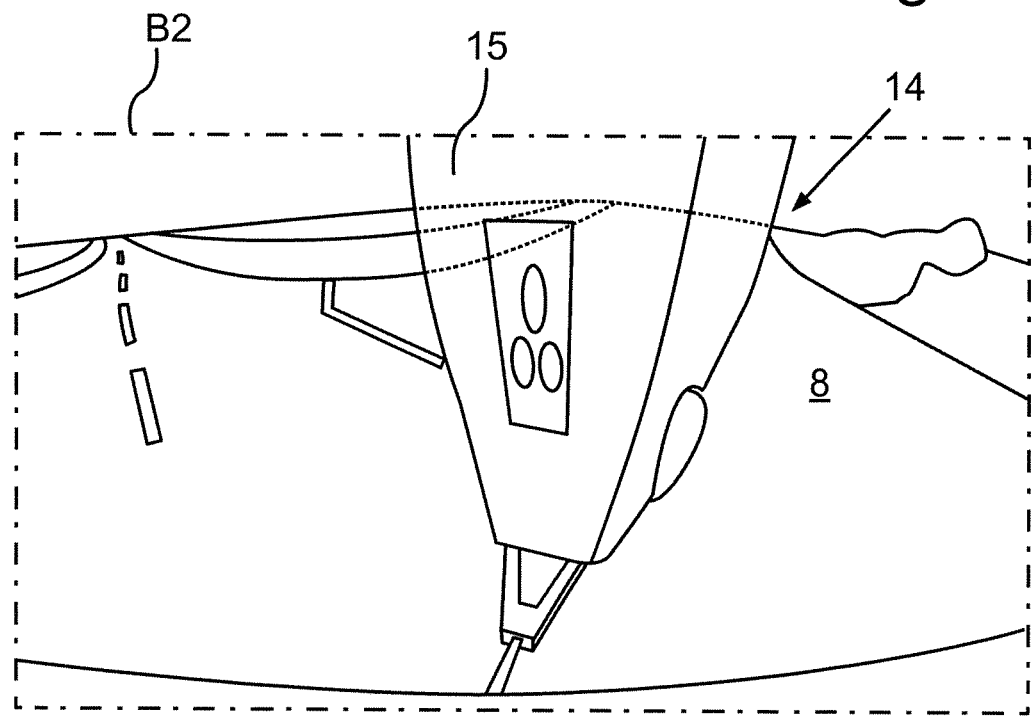
Figure 5:
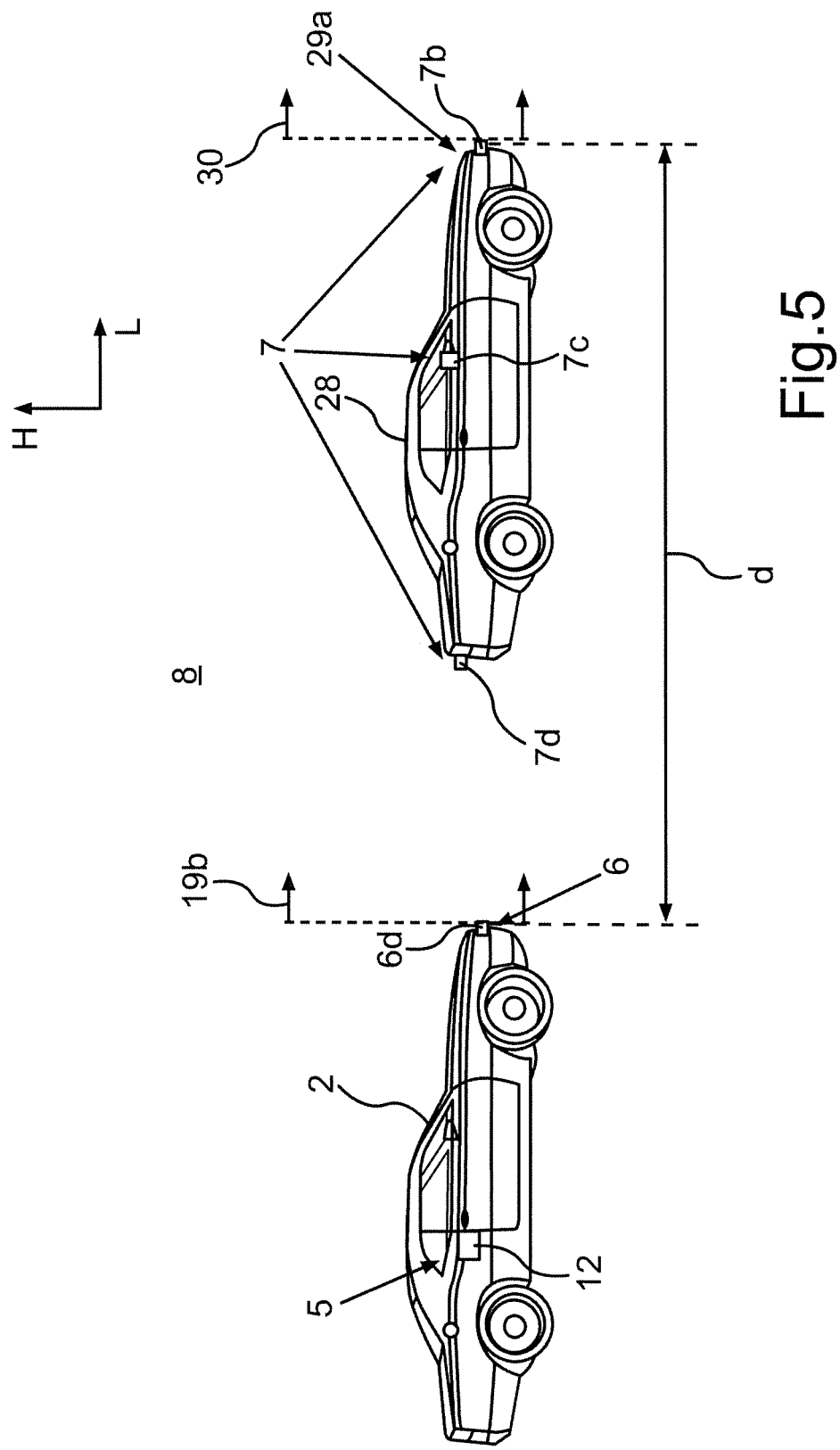
Figure 6:
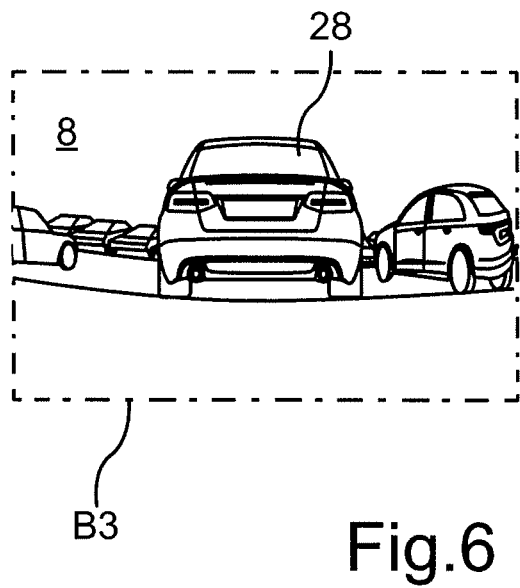
Figure 7:
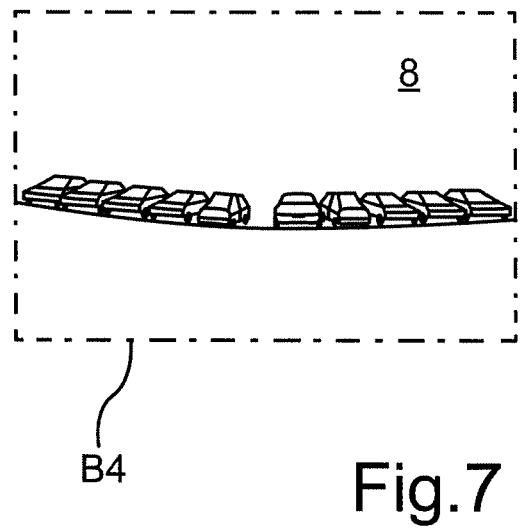
Figure 8:
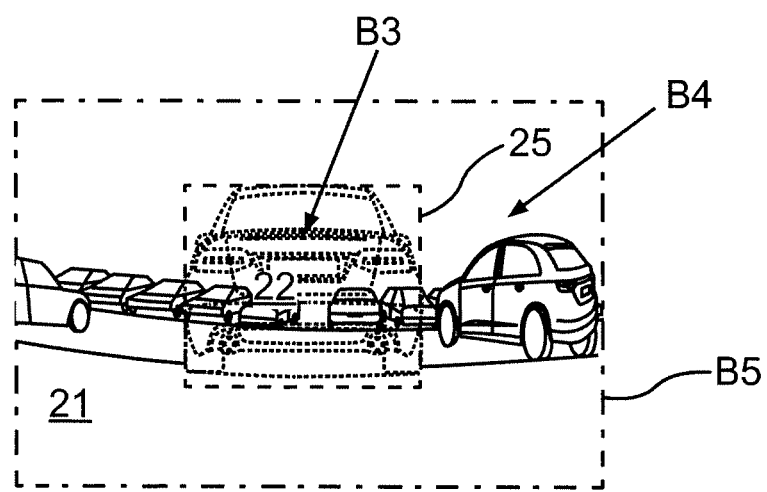
Figure 9:
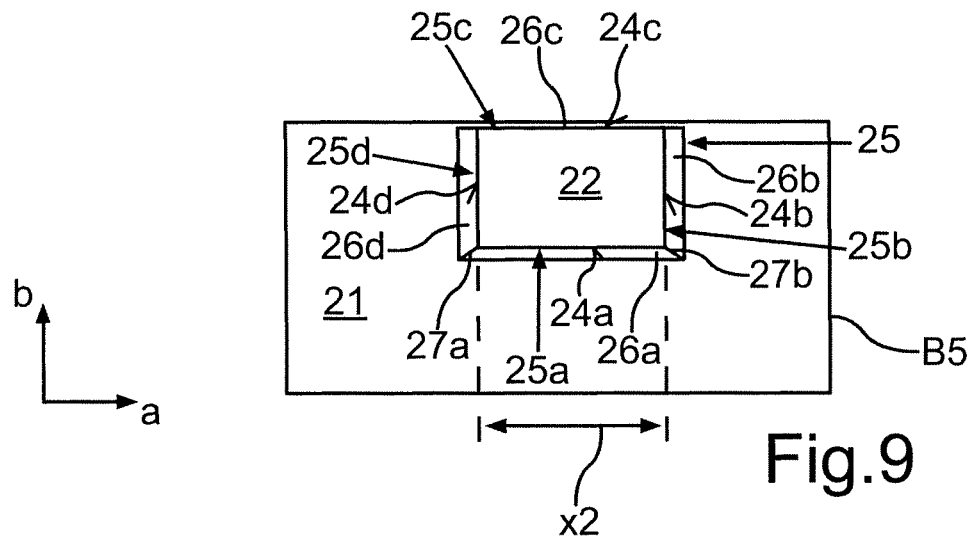
Figure 10:
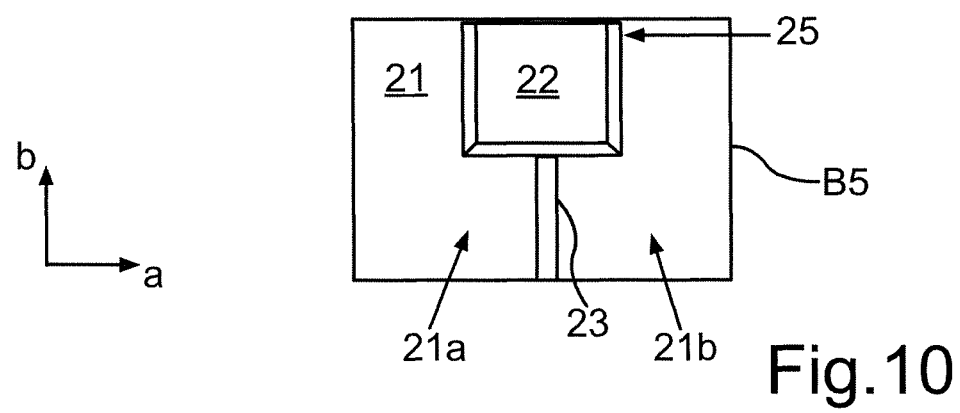
Figure 11:
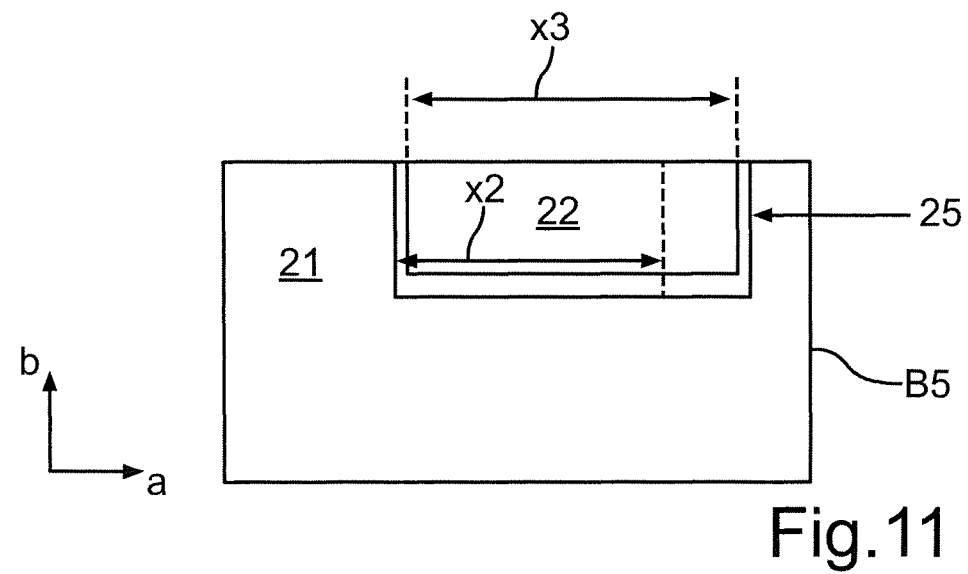

There show:

FIG. 1 a schematic representation of a vehicle/trailer combination in a plan view;

FIG. 2 a schematic representation of a vehicle/trailer combination in a side view;

FIG. 3 a schematic representation of an image displayed on a vehicle-side display device with a "transparent trailer" representation;

FIG. 4 a schematic representation of an image with the "transparent trailer" representation;

FIG. 5 a schematic representation of a motor vehicle and a vehicle driving in front of the motor vehicle;

FIG. 6 a schematic representation of an image captured by a camera system of the motor vehicle according to FIG. 5;

FIG. 7 a schematic representation of an image captured by the camera system of the other vehicle according to FIG. 5;

FIG. 8 a schematic representation of an image-in-image representation generated from FIG. 6 and FIG. 7;

FIG. 9 a schematic representation of an image displayed on the vehicle-side display device with an image-in-image representation;

FIG. 10 a schematic representation of a further image with the image-in-image representation; and FIG. 11 a schematic representation of a further image with the image-in-image representation.

In the figures, identical as well as functionally identical elements are provided with the same reference characters.

FIG. 1 and FIG. 2 show a vehicle/trailer combination 1 with a motor vehicle 2 and a trailer 3 coupled to the motor vehicle 2. In the present case, the motor vehicle 2 is formed as a passenger car. The trailer 3 can for example be a caravan or a horse trailer, which is coupled to the motor vehicle 2 via a tow coupling 4 and thus is supported pivotably with respect to the motor vehicle 2. The motor vehicle 2 comprises a driver assistance system 5, which assists a driver of the motor vehicle 2 in maneuvering or driving with the vehicle/trailer combination 1. Thereto, the driver assistance system 5 has a vehicle-side camera system 6. In the present case the driver assistance system 5 moreover comprises a vehicle-external camera system 7, which here is configured as a trailer-side camera system 7.

The vehicle-side camera system 6 can for example be formed as a surround-view camera system ("surround view system"—SVS), which can capture an environmental region 8 around the motor vehicle 2 in images. In the present case, the vehicle-side camera system 6 comprises a rear camera 6a, which is disposed in a rear area 9a of the motor vehicle 2 and can capture the environmental region 8 behind the motor vehicle 2 in images. In addition, the vehicle-side camera system 6 comprises two wing mirror cameras 6b, 6c, which are disposed at or instead of wing mirrors at the motor vehicle 2 and can capture the environmental region 8 next to and laterally behind the motor vehicle 2 in images. Additionally the camera system 6 can comprise a front camera 6d, which is arranged on a front region 9b of the motor vehicle 2 and can capture the environmental region 8 in front of the motor vehicle 2 in images. The cameras 6a, 6b, 6c are cameras looking in rearward direction R. Here, the vehicle-external camera system 7 comprises a trailer-side rear camera 7a, which is disposed in a rear area 10 of the trailer 3 and can capture the environmental region 8 behind the trailer 3 in images. The trailer-side rear camera 7 is therefore also a camera looking in rearward direction R.

In addition, the driver assistance system 5 comprises a vehicle-side display system 11, which includes a control device 12 and a display device 13. The control device 12, for example a video processor, can for example be integrated in a vehicle-side controller and receive the images from the environmental region 8 of the vehicle/trailer combination 1 captured by the camera systems 6, 7, for example via a wireless connection and/or in wired manner. Based on the images captured by the camera systems 6, 7, the control device 12 can generate representations for displaying on the display device 13. The display device 13 is in particular disposed in an interior of the motor vehicle 2, for example in a center console and/or a dashboard.

Such an already known representation for displaying on the display device 13 can for example be the image B1 shown in FIG. 3, which has been generated from the images of the vehicle-side rear camera 6a and the trailer-side rear camera 7a for example by means of composing or "stitching" the images. The image B1 was generated in the non-pivoted state of the trailer 3, for example upon straight travel of the vehicle/trailer combination 1. In the non-pivoted state, a longitudinal axis 16 of the trailer 3 is oriented along a vehicle longitudinal axis 17 such that a pivot angle 18 (see FIG. 1) is about 0°. Thereby, during the straight travel of the vehicle/trailer combination 1, a field of view 19a of the vehicle-side rear camera 6a and a field of view 20 of the trailer-side rear camera 7a are oriented along the same direction. The image B1 shows the environmental region 8 behind the motor vehicle 2 and the trailer 3 from a first-person perspective, which here corresponds to a camera perspective of the vehicle-side rear camera 6a. Therein, the image B1 is a so-called "transparent trailer" representation, in which a "transparent trailer" 14 is shown. This means that contours 15 or outlines of the trailer 3 are displayed in the image B1, which give information to the driver where the trailer 3 is located in the environmental region 8. However, the transparent trailer 14 represented in the image B1 does not cover the environmental region 8 behind the real trailer 3. Rather, the driver gets the impression as if he could see through the trailer 3 and perceive the environmental region 8 behind the trailer 3.

In FIG. 4, now, an image B2 in the form of the "transparent trailer" representation is shown, in which the images of the vehicle-side camera system 6 and of the trailer-side camera system 7 have been incorrectly combined. The defective image B2 results from the pivoted state of the trailer 3. In the pivoted state of the trailer 3, the pivot angle 18 (see FIG. 1) between the vehicle longitudinal axis 17 and the longitudinal axis 18 of the trailer 3 is unequal to 0°. The vehicle-side camera system 6 and the vehicle-external camera system 7 thus comprise a lateral offset y along the vehicle transverse direction Q. By this lateral offset y, thus the pivoting of the trailer 3, the field of view 20 of the trailer-side camera 7a is shifted to the field of view 19a of the vehicle-side rear camera 6a such that the images of the cameras 6a, 7a have not been correctly assembled. "Stitching" errors can also occur due to the positional difference, for example of a longitudinal axis distance d in vehicle longitudinal direction L and/or a height difference in vehicle vertical direction H between the rear camera 6a of the motor vehicle 2 and the rear camera 7a of the trailer 3. Due to the perspective difference of the camera systems 6, 7 resulting therefrom, it is difficult to seamlessly combine the images of the camera systems 6, 7. As a consequence, the environmental region 8 represented in the image B2 is not intuitive for the driver of the vehicle/trailer combination 1. In addition, in the implementation of the "transparent trailer" 14, it is difficult for the driver to estimate distances of objects behind the trailer 3 to the rear area 10 of the trailer 3 since a depth impression lacks for the driver in the images B1, B2.

Therefore, an operating mode for the display system 11 is provided by the control device 12, in which an image-in-image representation B5 is generated for displaying on the display device 13 (see for instance FIG. 9, 10, 11). The driver of the vehicle/trailer combination 1 can for example select the operating mode of the display system 11. Otherwise stated, the driver can select if the representation B1 of the "transparent trailer" 14 or the image-in-image representation B5 is to be displayed. Alternatively or additionally, the image-in-image representation B5 can be automatically provided if it is recognized that an errorless combination of the images of the two camera systems 6, 7 is not possible.

A further embodiment, in which the displaying of an image-in-image representation B5 is advantageous, is shown in FIG. 5. Here in front of the motor vehicle 2 a different motor vehicle 28 is driving. The other vehicle 28 here carries the vehicle-external camera system 7. The vehicle-external camera system 7 here comprises a front camera 7b, which is arranged on a front portion 29a of the other vehicle 28 and can capture images from the environmental region 8 in front of the other vehicle 28, as well as a wing mirror camera 7c. Moreover the other vehicle 28 comprises a rear camera 7d arranged on a rear portion of the other vehicle, which can capture images from the environmental region 8 behind the other vehicle 28.

The other vehicle 28 is situated in a field of view 19b of the front camera 6d viewing in the forward direction V of the vehicle-side camera system 6 of the motor vehicle 2. Thus, a partial area of the environmental region 8 in front of the motor vehicle 2 is covered by the other vehicle 28. The image B3 shown in FIG. 6 and captured by the vehicle-side front camera 6d thus shows the environmental region 8 in front of the motor vehicle 2 with another vehicle 28. In order to provide the driver of the motor vehicle 2 with information from the environmental region 8 in front of the other vehicle 28, an image B4 (see FIG. 7) of that camera 7b of the vehicle-external camera system 7 is received by the control unit 12 of the driver assistance system 5 of the motor vehicle 2, whose field of view 30 is orientated along the field of view 19b of the front camera 6d. Thus, it is received the image B4 of a camera 7b equally viewing in the forward direction V of the vehicle-external camera system 7, i. e. for instance the front camera 7b of the other vehicle 28. The image B4 represented in FIG. 7 shows the environmental region 8 in front of the other vehicle 28. The image B4 in this connection is transmitted wirelessly from the vehicle-external camera system 7 to the control device 12 of the motor vehicle 2. From the images of the vehicle-side camera system 6 as well as from the images of the vehicle-external camera system 7 then the image-in-image representation B5 is generated, as it is schematically shown in FIGS. 8, 9, 10, 11. The image-in-image representation B5 in this connection comprises a first image region 21 as well as a second image region 22, which is smaller in comparison with the first image region 21. In the first image region 21 the first images captured by the vehicle-side camera system 6 are represented, in particular in the form of a video sequence. In the second image region 22 the second images captured by the vehicle-external camera system 7 are represented. In the image-in-image representation B5 according to FIG. 8 for instance in a first image region 21 the image B3 captured by the vehicle-side front camera 6d is represented and in the second image region 22 the image B4 captured by the front camera 7b of the other vehicle 28 is represented.

In FIG. 9 and FIG. 11, the vehicle-side images were captured by the rear camera 6a of the motor vehicle 2 (in the case of the trailer 3 or in the case that the other vehicle 28 follows the motor vehicle 2 and thus is present behind the motor vehicle 2) or the front camera 6d of the motor vehicle 2 (in the case that the other vehicle 28 drives in front of the motor vehicle 2 and thus is present in front of the motor vehicle 2) such that the first images captured by the rear camera 6a or the front camera 6d are displayed in the entire first image region 21 of the image-in-image representation B5 according to FIG. 9 and FIG. 11. In FIG. 10, the vehicle-side first images were captured by the wing mirror cameras 6b, 6c. Here, the first image region 21 of the image-in-image representation B5 according to FIG. 10 is divided into two partial image regions 21a, 21b, wherein the images captured by the left wing mirror camera 6a are displayed in the left partial image region 21a and the images captured by the right wing mirror camera 6c are displayed in the right partial image region 21b. The two partial image regions 21a, 21b are separated by a separating element, which is displayed in the form of a stripe 23 extending in vertical image direction b in the image-in-image representation B5.

In the second image region 22, the images captured by the vehicle-external camera system 7 are represented simultaneously or at the same time, in particular also in the form of a video sequence. Thus, in the case of the vehicle/trailer combination 1, the driver of the vehicle/trailer combination 1 can capture or perceive the environmental region 8 behind the motor vehicle 2 and behind the trailer 3 at the same time with a look to the display device 13, which displays the image-in-image representation B5. Therein, the second image region 22 is in particular surrounded by the first image region 21 on at least three lateral edges 24a, 24b, 24c, 24d. A minimum width x2 of the second image region 22 extending in horizontal image direction a is in particular determined depending on a width of the device 3, 28 carrying the vehicle-external camera system 7. In concrete terms this means for instance that the minimum width x2 of the second image region 22 is determined in dependency on a width x1 of the trailer 3 (see FIG. 1) or a width of the other vehicle 28. The width x1 of the trailer 3 can for example be manually input by the driver of the vehicle/trailer combination 1 and/or be automatically determined during a calibration process, in which trailer-side parameters are for example captured by sensors and/or communicated from the trailer 3 to the motor vehicle 2. Also the width x1 of the trailer 3 or the width of the other vehicle 28 can be captured by a sensor device of the motor vehicle 2.

In addition, a perspective representation of a bevel frame 25 or of a bevel is shown in the image-in-image representations B5, which surrounds the second image region 22 at least in certain areas. A depth effect can be generated by the frame 25, by which the second image region 22 appears offset with respect to the first image region 21. Whether the second image region 22 in relation to the first image region 21 is meant to appear forward offset or rearward offset, derives from the position of the vehicle-side camera system 6 with regard to the vehicle-external camera system 7 or the position of the motor vehicle 2 relative to the device along the vehicle longitudinal direction L. In the case of the trailer 3 or a vehicle 28 following the motor vehicle 2 the second image region 22 is meant to appear rearward offset relative to the first image region 21. In the case of a vehicle 28 driving in front of the motor vehicle 2 the second image region 22 is meant to appear forward offset relative to the first image region 21.

Thereto, the frame 25 in particular has four frame elements 25a, 25b, 25c, 25d forming a rectangle, joining up in meter, which are formed as perspective representations of bevel areas 26a, 26b, 26c, 26d. The miters are formed by bevel edges 27a, 27b, wherein the depth of the second image region 22 with respect to the first image region 21 can be changed by a length of the bevel edges 27a, 27b. Via a respective width of the bevel areas 26a, 26b, 26c, 26d, the viewing angle can be set, from which the driver looks from the first image region 21 into the second image region 22. Here, the width of the bevel area 26c forming the upper horizontal frame element 25c tends to zero such that the frame element 25c is stripe-shaped formed. The bevel areas 26b, 26d forming the vertical frame elements 25b, 25d have the same width such that the impression is conveyed to the driver as if he would frontally look into the second image region 22 from obliquely below. The perspective difference between the image regions 21, 22, thus the depth of the second image region 22 with respect to the first image region 21, and the viewing direction from the first image region 21 into the second image region 22, can be set via the shape of the bevel areas 26a, 26b, 26c, 26d, thus a width of the bevel areas 26a, 26b, 26c, 26d as well as a length and orientation of the bevel edges 27a, 27b. The perspective difference is in particular determined depending on a current position or location of the vehicle-external camera system 7 to the vehicle-side camera system 6.

An image position and/or a width x2, x3 of the second image region 22 in the image-in-image representation B5 can also be determined depending on the relative location between the camera systems 6, 7, in particular depending on a lateral positional difference of the camera systems 6, 7 in vehicle transverse direction Q. The lateral position of the trailer-side camera system 7 to the vehicle-side camera system 6 (see FIG. 1) for instance changes if the trailer 3 pivots. Thus, in the case of the combination 1 the image position of the second image region 22 can be determined depending on the pivot angle 18.

If the trailer 3 for example pivots to the right, i. e. if the vehicle-external camera system 7 with regard to the vehicle side camera system 6 is offset to the right, thus, a width x3 for the second image region 22 can be determined as shown in FIG. 11, which is increased to the right with respect to the minimum width x2 in horizontal image direction a. Alternatively or additionally, the entire second image region 22, which is determined located centrally in the image-in-image representation B5 by default, can be shifted to the right in horizontal image direction a. In the case of a lateral offset y unequal to zero, i. e. for instance in the pivoted state of the trailer 3, a shape of the second image region 22 can also be changed with respect to a shape of the second image region 22 in the case of a lateral offset y equal to zero, i. e. for instance in the non-pivoted state of the trailer 3. For example, the shape of the second image region 22 can be rectangular in the non-pivoted state and trapezoidal in the pivoted state. Corresponding to the shape and location of the second image region 22, a perspective representation of the frame 25, for example a length of the horizontal frame elements 25a, 25c, is adapted.

It can also be provided that the frame 25 is used to provide further assistance functions of the driver assistance system 5 to the driver. Thus, the presence of an object in the environmental region 8 of the motor vehicle 2 can for example be detected based on the images of the camera systems 6, 7 and/or based on sensor data of further sensors of the motor vehicle 2 and the driver can be warned of the object by for example changing a color of the frame 25 and/or presenting the frame 25 or individual frame elements 25a, 25b, 25c, 25d in flashing manner. For example, if an object in the form of cross-traffic approaches the motor vehicle 2 from the right or an object is in the right blind spot of the motor vehicle 2, thus, the right-side vertical frame element 25b can be presented flashing and/or in another color.

In the case of the combination 1 the color of the frame 25 can indicate a calibration status of the trailer 3 with respect to the motor vehicle 2. In the non-calibrated case, the parameters of the trailer 3, for example a length, width x1 and height of the trailer 3, are not or not yet available for the control device 12 such that certain assistance functions, for example the display of orientation lines on the display device 13, cannot be provided. If the frame 25 is for example presented in grey on the display device 13, thus, the driver is made aware of the non-calibrated system, if the frame 25 is for example presented in green on the display device 13, thus, the driver is made aware of the calibrated system.

If the trailer-side camera 7 is disposed at a pivotable tailgate of the trailer 3, thus, the display of the image-inimage representation B5 is in particular terminated if the motor vehicle 2 stands and the tailgate of the trailer 3 is opened. The opening of the tailgate of the trailer 3 can for example be detected based on motion sensors and/or based on the images of the trailer-side camera system 7.

The invention claimed is:

1. A method for providing at least one information from an environmental region of a motor vehicle to a driver of the motor vehicle, comprising:
    capturing at least one first image of the environmental region by at least one camera of a vehicle-side camera system;
    capturing at least one second image of the environmental region by a trailer-side camera of the vehicle-external camera system present within a field of view of the vehicle side-camera system, wherein the trailer-side camera is on a trailer attached to the motor vehicle;
    receiving the captured at least one first and second images; and
    generating an image-in-image representation from the received at least one first image and the received at least one second image for displaying on a vehicle-side display device as the at least one information,
    wherein a first image region for displaying the at least one first image and a second image region separate from the first image region for displaying the at least one second image are determined for the image-in-image representation,
    wherein a perspective representation generating a depth effect of a bevel frame surrounding the second image region at least in certain areas is determined for displaying on the display device, by which the second image region appears offset with respect to the first image region in the image plane of the image-in-image representation, and
    wherein for generating a predetermined perspective difference between the second image region and the first image region, a shape of the frame is determined depending on a position of the trailer-side camera system with respect to a position of the vehicle-external camera system.

2. The method according to claim 1, wherein the at least one second image is captured by at least one camera of the vehicle-external camera system of a different vehicle present in the field of view of the vehicle-side camera system and the at least one first image is captured by at least one camera of the vehicle-side camera system, wherein the field of view of the at least one vehicle-side camera is oriented along a field of view of the at least one camera of the vehicle-external camera system.

3. The method according to claim 1, wherein frame elements are determined for the perspective representation of the frame, which are displayed adjoining to lateral edges of the second image region upon displaying on the display device and which are formed from perspective representations of bevel areas, wherein a width of the bevel areas and an orientation of bevel edges of the bevel areas are changed for generating the predetermined perspective difference.

4. The method according to claim 1, wherein a minimum width of the second image region in horizontal image direction in the image-in-image representation is determined depending on a width of a device carrying the vehicle-external camera system.

5. The method according to claim 1, wherein the second image region is determined located centrally within the image-in-image representation in horizontal image direction.

6. The method according to claim 1, wherein a width of the second image region and/or a location of the second image region in the image-in-image representation and/or a shape of the second image region are adapted to a lateral offset between the vehicle-side camera system and the vehicle-external camera system.

7. The method according to claim 1, wherein in case of receiving at least one first partial image captured by a left wing mirror camera of the vehicle-side camera system and at least one second partial image captured by a right wing mirror camera of the vehicle-side camera system, the first image region is divided into a first partial image region for displaying the first partial image and a second partial image region for displaying the second partial image.

8. The method according to claim 7, wherein a graphic separating element for separating the first and the second partial image region in the shape of a vertical stripe is determined for displaying on the display device, wherein the first partial image region is displayed adjoining to the graphic separating element on the left side and the second partial image region is displayed adjoining to the graphic separating element on the right side.

9. The method according to claim 1, wherein based on received vehicle-side and/or vehicle-external sensor data, an object in the environmental region of the motor vehicle is detected and the presence of the object is visualized as at least one further information by changing a color of the frame at least in certain areas in displaying on the display device.

10. The method according to claim 1, wherein a status of a calibration of the trailer-side camera system of the vehicle-external, trailer-side camera system, in which at least one geometric dimension of the trailer is captured and determined and a color of the perspective representation of the bevel frame is determined depending on the status of the calibration.

11. The method according to claim 1, wherein a distance between the motor vehicle and the trailer is captured in a pivoted state of the trailer, wherein a color of the frame is changed and/or a warning symbol is displayed as soon as the distance falls below a predetermined limit value.

12. A display system for a motor vehicle comprising:
    a control device; and a display device,
    wherein the control device is configured to:
        receive at least one first image captured by at least one camera of a vehicle-side camera system and at least one second image captured by a trailer-side camera of a vehicle-external camera system present within a field of view of the vehicle-side camera system, wherein the trailer-side camera is on a trailer attached to the motor vehicle, and
        generate an image-in-image representation from the at least one first image and the at least one second image for displaying on the vehicle-side display device, and
        determine a first image region for displaying the at least one first image and a second image region separate from the first image region for displaying the at least one second image for the image-in-image representation, and
    wherein the display device is adapted to display the image-in-image representation,
    wherein a perspective representation generating a depth effect of a bevel frame surrounding the second image region at least in certain areas is determined for displaying on the display device, by which the second image region appears offset with respect to the first image region in the image plane of the image-in-image representation, and wherein for generating a predetermined perspective difference between the second image region and the first image region, a shape of the frame is determined depending on a position of the trailer-side camera system with respect to a position of the vehicle-external camera system.

13. A driver assistance system for a motor vehicle for assisting a driver of the motor vehicle, comprising:
a vehicle-side camera system disposed at the motor vehicle and for capturing at least one first image; and
a display system according to claim 12.

14. A motor vehicle comprising a driver assistance system according to claim 13.

* * * * *